United States Patent [19]
Barker et al.

[11] 3,864,166
[45] Feb. 4, 1975

[54] PROCESS FOR THE SEPARATION OF SUGARS

[75] Inventors: Sidney Alan Barker; Peter John Somers, both of Birmingham; Brian William Hatt, Bromsgrove, all of England

[73] Assignee: Boehringer Mannheim GmbH, Mannheim, Germany

[22] Filed: May 30, 1973

[21] Appl. No.: 365,360

[30] Foreign Application Priority Data
June 5, 1972 Germany............................ 2229208

[52] U.S. Cl. ............................ 127/46 R, 260/209 R
[51] Int. Cl. ........................... C13d 3/12, C13k 9/00
[58] Field of Search............ 127/42, 46 R, 46 A, 30; 260/209 R

[56] References Cited
UNITED STATES PATENTS

| | | | |
|---|---|---|---|
| 2,813,810 | 11/1957 | Smith | 127/46 R |
| 2,818,851 | 1/1958 | Khym | 127/46 A |
| 2,845,369 | 7/1958 | Davis | 127/46 A |
| 3,692,582 | 9/1972 | Meldja | 127/46 A |

*Primary Examiner*—Morris O. Wolk
*Assistant Examiner*—Sidney Marantz
*Attorney, Agent, or Firm*—Burgess, Dinklage & Sprung

[57] ABSTRACT

Mixtures of sugars and of sugar alcohols are separated into their component parts by subjecting aqueous solutions of the mixture to chromatography on an insoluble organic resin, wherein the resin is an aryl boric acid group-containing resin.

9 Claims, No Drawings

PROCESS FOR THE SEPARATION OF SUGARS

The present invention relates to a process for the separation of sugars and sugar alcohols by chromatography of their aqueous solutions on insoluble organic resins and, in particular, is concerned with a process for the separation of D-fructose from D-glucose and/or D-mannose.

Sugars and sugar alcohols normally occur in nature and also in chemical production in the form of mixtures which must be separated by more or less laborious purification processes. Besides the very well-known separation by fractional crystallization and the precipitation of the individual components with appropriate precipitation agents, recently use has also been made of chromatographic separation in columns filled with synthetic resins, not only in the laboratory but also on a large scale. The exchanger resins hitherto employed have usually been cation exchangers in the salt form (see, for example, U.S. Pat. No. 3,044,905). Since the loading capacity and selectivity of the known column materials especially when used for the large scale separation of sugars, is not sufficient, there is a very considerable need for an improved column material.

We have now found that organic resins which are substituted by aryl boric acid groups are especially suitable for the chromatographic separation of sugars and sugar alcohols.

Thus, the present invention provides a process for the separation of sugars and sugar alcohols comprising subjecting aqueous solutions thereof to chromatography on insoluble organic resins, wherein the resin used is an aryl boric acid group-containing resin.

The instant process is applicable both to the separation of the components of sugar mixtures and to the separation of the components of sugar alcohol mixtures.

It has already been suggested to convert carboxymethylcellulose into azides and to couple these with aminophenyl boric acid (see Weith et al., Biochem. J., 9, 4396/1970). The resins thus obtained enable a separation and identification of nucleic acids, sugars and other polyhydroxyl compounds to be carried out on a laboratory scale. However, these resins are not suitable for a large scale separation of sugars because boric acid-containing buffers must be used for the elution, the separation of which from the purified sugar fractions is uneconomic on a large scale.

The resins preferably used according to the process of the present invention are the polymers and copolymers of 4-vinylphenyl boric acid or derivatives thereof, which have been described by Letsinger (J.A.C.S., 81, 3009/1959) and by Hoffmann (J.A.C.S., 81, 580/1959). It has proved to be especially advantageous to start from iminodiethyl-4-vinylphenyl boric acid esters which can be radical polymerized in a simple manner in organic solvents, for example in chloroform, benzyl alcohol, dimethyl formamide or the like. The radical polymerization is initiated in the usual manner, for example by the use of azo-bis-isobutyric acid nitrile. By the addition of varying amounts of divinyl-benzene, the degree of cross-linking of the resultant resin can be regulated within wide limits. It has proved to be advantageous only to add small amounts of divinyl-benzene in order to obtain slightly cross-linked, strongly swelling resins.

The properties of the resins can also be varied by adding other monomers, for example styrene, to the polymerization mixture. The greatest possible purity of the starting monomers has also proved to be advantageous for the polymerization.

The resins used according to the present invention permit the alteration, with certain limits, by alteration of the temperature used and of the pH value of the elution agent, of the retention behavior for individual sugars within certain limits so that optimum conditions can be obtained for special separation problems.

The separation process according to the present invention is preferably carried out at a temperature of 10° to 80°C. and at a pH of between 3 and 13.

A further possibility of variation is provided by the use of amino, alkoxy, sulfonyl or nitro group -containing vinylphenyl boric acids as monomers. The $pK_a$ value of the polymers so obtained differs, of course, from the $pK_a$ value of the resins obtained from unsubstituted polyvinyl phenyl boric acid: in particular, the behavior at different pH values of the elution agent is altered.

In general, the best separations are obtained when the pH value of the elution agent corresponds to the $pK_a$ value of the resin used because, in this case, disturbances due to insufficient buffering do not occur.

The following Examples are given for the purpose of illustrating the present invention:

Example 1 — Production of poly-(4-vinylphenyl boric acid) resin.

25 g. iminodiethyl-4-vinylphenyl boric acid, 1 g. divinyl-benzene/ethyl-vinyl-benzene (53:47 w/w) and 0.07 g. azobis-isobutyric acid nitrile were dissolved in 80 ml. dry benzyl alcohol and the solution was freed from air by passing through nitrogen. Subsequently, the mixture was maintained for 20 hours at 70°C. under an atmosphere of nitrogen. The resultant gel was washed with chloroform, dried, comminuted and washed with 1N hydrochloric acid until the wash water no longer gave a yellow coloration with periodate/pentane-2,4-dione. Subsequently, the resin was washed with water until free of acid and then dried over phosphorus pentoxide. The yield of resin obtained was about 81%. For the experiments described in the following Examples, there was separated off a sieve fraction of 60–120 mesh (about 12 g.).

Example 2 — Elution velocity of various sugars on a column of poly-(4-vinylphenyl boric acid) resin.

12 g. of a resin prepared according to Example 1 were swollen with water, filled into a column (123 × 0.6 cm.) which was thermostatically controlled at 20°C. and washed with a current of air-free water of pH 6.1 at a rate of about 0.16 ml./minute. 20 to 200 μg amounts of various sugars were dissolved in 0.2 ml. amounts of water and applied to the column. The rate of elution was determined by determination of the sugar concentration in the fractions running off, using the automated periodate/pentane-2,4-dione method. In the following Table 1, there are given the retention factors (elution volume/resin bed volume) for the various sugars and the form of the elution curve is also indicated:

TABLE 1

Elution of sugars on a column of poly-(4-vinylphenyl boric acid) resin.

| Compound | Retention factor | Form of the peaks* |
|---|---|---|
| D-glucose | 0.73 | S |
| D-fructose | 1.44 | A |
| D-mannose | 0.75 | S |
| D-galactose | 1.16 | A |
| D-lyxose | 0.84 | A |
| L-arabinose | 0.84 | A |
| D-xylose | 0.82 | A |
| D-ribose | — | B |
| Maltose | 0.70 | S |
| Ethylene glycol | 1.07 | S |

\* S = sharp; B = broad; A = asymmetrical.

Example 3 — Influence of temperature and pH on the rate of elution of D-glucose and D-fructose.

D-glucose and D-fructose were eluted over the same column as is described in Example 2. The results, which were obtained at column temperatures of 20°C., 25°C. and 50°C., are summarized in the following Table 2, all the experiments having been carried out at a pH of 6.1.

In a further series of experiments, at a constant temperature of 20°C. and at pH values of 3.0, 5.1, 6.1 and 10.0, there was investigated the dependence of the retention factors on the pH. The results obtained are summarized in Table 3.

TABLE 2

Influence of temperature on the retention factors of D-glucose and D-fructose at pH 6.1

| sugar | 20°C. | 25°C. | 50°C. |
|---|---|---|---|
| D-glucose | 0.73 | 0.75 | 0.83 |
| D-fructose | 1.44 | 1.80 | 2.61 |

TABLE 3

Influence of the pH on the retention factors of D-glucose and D-fructose at 20°C.

| sugar | pH 3.0 dilute formic acid | pH 5.1 dilute formic acid | pH 6.1 | pH 10.0 aq.sodium hydroxide solution |
|---|---|---|---|---|
| D-glucose | 0.76 | 0.73 | 0.73 | 0.78 |
| D-fructose | 1.34 | 1.42 | 1.44 | 4.30 |

Example 4 — Separation of a mixture of D-glucose and D-fructose.

0.2 ml. of a solution containing 0.2 mg. D-glucose and 2.0 mg. D-fructose and 0.2 ml. of a solution containing 0.2 mg. D-glucose and 0.2 mg. D-fructose were each applied to a column according to Example 2. The column, which was thermostatically controlled at 20°C., was washed with dilute formic acid (pH 5.1) at an elution velocity of 0.17 ml./minute. The glucose and fructose contents of the individual fractions is given in the following Table 4. It can be seen that, in spite of the marked spread of the fructose peak, the two sugars were completely separated from one another.

The following Table 5 gives the retention factors in corresponding experiments in which the composition of the sugars or of the pH value of the solution were varied. The form of the elution curves for the individual sugars is indicated by S = sharp, B = broad and A = asymmetrical.

TABLE 4

Separation of a mixture of D-glucose and D-fructose

| Retention factor | 20°C | | 50°C | |
|---|---|---|---|---|
| | Glucose | Fructose | Glucose | Fructose |
| 0 | 0 | 0 | 0 | 0 |
| 0.25 | 0 | 0 | 0 | 0 |
| 0.5 | 52 | 0 | 13 | 0 |
| 0.75 | 133 | 3 | 100 | 8 |
| 1.0 | 3 | 83 | 63 | 0 |
| 1.25 | 0 | 245 | 20 | 2 |
| 1.5 | 0 | 337 | 0 | 9 |
| 1.75 | 0 | 295 | 0 | 13 |
| 2.0 | 0 | 245 | 0 | 23 |
| 2.25 | 0 | 196 | 0 | 30 |
| 2.5 | 0 | 158 | 0 | 35 |
| 2.75 | 0 | 133 | 0 | 32 |
| 3.0 | 0 | 102 | 0 | 22 |
| 3.25 | 0 | 79 | 0 | 16 |
| 3.5 | 0 | 50 | 0 | 11 |
| 3.75 | 0 | 31 | 0 | 5 |
| 4.0 | 0 | 17 | 0 | 2 |
| 4.25 | 0 | 8 | 0 | 0 |
| 4.5 | 0 | 0 | 0 | 0 |
| 4.75 | 0 | 0 | 0 | 0 |
| 5.0 | 0 | 0 | 0 | 0 |

TABLE 5

Separation of D-glucose, D-fructose and D-mannose on a column of poly-(4-vinylphenyl boric acid) resin.

| pH of the elution agent | sugar | amount | Retention factor of the peaks | Form of the peaks |
|---|---|---|---|---|
| 7.3 | D-glucose | 250 µg | 1.02 | S |
| | D-mannose | 310 µg | 0.98 | S |
| | D-fructose | 250 µg | 1.46 | S |
| 7.3 | D-glucose | 100 µg | 1.04 | S |
| | D-fructose | 100 µg | 1.42 | S |
| 7.3 | D-mannose | 180 µg | 1.08 | S |
| | D-fructose | 100 µg | 1.42 | S |
| 9.6 | D-glucose | 250 µg | 0.48 | S |
| | D-mannose | 250 µg | 0.60 | S |
| | D-fructose | 250 µg | 5.25 | B |
| 9.6 | D-glucose | 250 µg | 0.48 | S |
| | D-fructose | 750 µg | 4.25 | B |
| 9.6 | D-mannose | 250 mg | 0.71 | S |
| | D-glucose | 250 mg | 0.81 | S |
| | D-fructose | 250 mg | 0.92 | A |

It will be understood that the specification and examples are illustrative but not limitative of the present invention and that other embodiments within the spirit and scope of the invention will suggest themselves to those skilled in the art.

What is claimed is:

1. Process for the separation of mixtures of sugars and of sugar alcohols comprising subjecting an aqueous solution thereof to chromatography on an insoluble organic resin, wherein the resin used is an aryl boric acid group-containing resin, and recovering the component sugars or sugar alcohols obtained.

2. Process for the separation of D-fructose from at least one member of the group consisting of D-glucose and D-mannose comprising subjecting an aqueous solutions thereof to chromatography on an insoluble organic resin, wherein the resin used is an aryl boric acid group-containing resin.

3. Process as claimed in claim 1 wherein the resin used is a polymer or copolymer of 4-vinyl-phenyl boric acid or of a derivative thereof.

4. Process as claimed in claim 1 wherein the resin used is prepared based on at least one of styrene and divinylbenzene as a comonomer.

5. Process as claimed in claim 1 wherein the separation is carried out at a temperature of 10° – 80°C.

6. Process as claimed in claim 1 wherein the separation is carried out at a pH of between 3 and 13.

7. Process as claimed in claim 6, wherein the pH of the elution agent used corresponds to the $pK_a$ value of the resin.

8. Process as claimed in claim 1, wherein a mixture of sugars is separated.

9. Process as claimed in claim 1, wherein a mixture of sugar alcohols are separated.

* * * * *